United States Patent [19]
Arons et al.
[11] Patent Number: 4,486,401
[45] Date of Patent: Dec. 4, 1984

[54] PRODUCTION OF FINE FERRIMAGNETIC SPINELS

[75] Inventors: Richard M. Arons, Chatham; Lawrence D. David, Florham Park, both of N.J.

[73] Assignee: Celanese Corporation, New York, N.Y.

[21] Appl. No.: 475,003

[22] Filed: Mar. 14, 1983

[51] Int. Cl.[3] .................... C01G 49/00; C01G 51/00; C01G 53/00

[52] U.S. Cl. ................................ 423/594; 252/62.62

[58] Field of Search ...................... 423/594; 252/62.62

[56] References Cited

U.S. PATENT DOCUMENTS

| | | | |
|---|---|---|---|
| 3,872,027 | 3/1975 | Christmann et al. | 423/594 |

FOREIGN PATENT DOCUMENTS

| | | | |
|---|---|---|---|
| 140721 | 11/1980 | Japan | 423/594 |
| 26727 | 3/1981 | Japan | 423/594 |
| 26726 | 3/1981 | Japan | 423/594 |
| 1253807 | 11/1971 | United Kingdom | 423/594 |

*Primary Examiner*—Herbert T. Carter
*Attorney, Agent, or Firm*—Depaoli & O'Brien

[57] ABSTRACT

The present invention provides an improved gel precipitation method for producing a $Ni_{0.7}Zn_{0.3}Fe_2O_4$ type of ferrimagnetic spinel powder which has an average particle size of less than about 1000 angstroms.

12 Claims, No Drawings

PRODUCTION OF FINE FERRIMAGNETIC SPINELS

BACKGROUND OF THE INVENTION

Finely divided oxide powders are useful in the manufacture of coating compositions, intricately shaped and fine-grained ceramics, cermets, and the like. Small particles are particularly important in the preparation of powder mixtures. In general, the smaller the particle size, the more uniform are the compositions and the better the mechanical properties of metal, ceramic, and cermet articles prepared from the powder mixtures.

Of particular concern for purposes of the present invention are processes for the production of finely divided magnetic particles, i.e., particulate materials that an applied magnetic field can induce to change from a nonmagnetized condition (exhibiting no external fields) into a magnetized condition (exhibiting external fields), and which after removal of the applied magnetic field remain at least partially magnetized in the sense of continuing to exhibit external fields.

As described in U.S. Pat. No. 3,425,666, conventional ferrimagnetic material production involves preparation of polycrystalline magnetic materials in two main steps: (a) prepartion of a mixture, as uniform as possible, of the nonferrimagnetic starting materials, and (b) conversion of said starting materials at an elevated temperature to produce the desired ferrimagnetic material by solid state reaction. An example is the solid state reaction of NiO with $Fe_2O_3$ at an elevated temperature, to produce the nickel ferrite, $NiFe_2O_4$.

In this type of solid state reaction the starting materials generally are prepared in powdered form, placed together, and heated. The heating causes a mutual diffusion of constituents of each starting material and the growth of a crystallite of the desired ferrimagnetic ferrospinel. When the resulting material is needed commercially in solid form, usually the material is powdered again. Thereafter, if a solid shape is desired, the powder is formed into the desired shape and sintered.

Generally the starting materials in the oxide form are mixed together in the desired proportions by dry or wet ball milling. After the milling the material is heated to 500°-800° C., and the resulting material is crushed and milled again. This process can be further repeated to obtain additional homogeneity.

Another procedure involves the decomposition method, in which the starting materials are mixed by milling in the salt form instead of the oxide form, and then the salts are converted to the oxides by thermal decomposition in air.

Another procedure involves the precipitation method, which has been utilized in an attempt to avoid the lengthy milling process of the oxide and decomposition methods. The objective is to precipitate from a solution the required materials simultaneously in either a hydroxide or oxalate form to yield a precipitate containing the required metal hydroxides or metal oxalates in the correct proportions intimately mixed.

The above described oxide, decomposition, and precipitation methods involve various disadvantages. In the oxide and decomposition methods the lengthy ball milling that is required is a disadvantage. Even with extended ball milling there is room for much improvement in the homogeneity of the resulting mixture.

The precipitation methods directionally improve mixture homogeneity, but entail other disadvantages. For example, when a strong base such as sodium hydroxide is used to cause precipitation, the anion must be removed from the resulting mixture to purify it, and this can present a difficult purification problem.

U.S. Pat. No. 3,822,210 describes a process for producing fine spinel-type ferrite particles which are highly dispersible. Spinel-type single-crystal ferrite particles are provided of substantially isotropic shape containing iron and at least one kind of divalent metal other than iron, the ratio of the total number of iron atoms to the divalent metal atoms being at least 2 to 1 and the average particle size ranging from about 0.05 to 1.0 micron. The ferrite crystals are made by admixing an aqueous solution containing ferrous ions and the divalent metal ions with 0.55 to 3 mol equivalents, relative to acid in the solution, of an alkali to obtain a suspension of the hydroxides at a pH of more than 6.5 and thereafter bubbling an oxidizing gas into the suspension maintained at 60° C. to 90° C. until the hydroxides disappear and ferrite particles are formed.

U.S. Pat. No. 4,097,392 describes a manufacturing process for ferrimagnetic materials and pressure-compacted soft ferrite components utilizing a wet process for compositional preparation of materials in which metal carbonates and metal hydroxides are coprecipitated in controllably selected ratios. An aqueous solution of metal ions is formed by dissolving pure metals in acid. This aqueous metal ion solution is added to a predetermined solution of carbonate ions and hydroxide ions. Concentrations, temperature, and rates of addition are controlled to select the ratio of carbonate groups to hydroxide groups in the coprecipitated particles and the size of such particles. The controllably selected ratio of carbonate groups to hydroxide groups facilitates separation of the coprecipitation particles and maintains residual hydroxide groups in the material so as to extend solid-state reactivity of the coprecipitated particles for grain growth and densification purposes until the final heat treatment in which the pressure compacted articles are sintered.

In Bull. Amer. Ceram. Soc., 61(3), 362 (1982) and in Ferrites, Proc., ICF, 3rd [48TRAI] 1980 (Pub. 1982), 23–26, a process is described for the preparation of high performance ferrites from metal acetylacetonates. A solution of iron, zinc, and manganese acetylacetonates in ethanol is refluxed for one hour. The solution is treated with ammonium hydroxide to a pH level of 10–11, and the treated solution is refluxed two hours to precipitate solids. The solids are recovered, microwave dried, calcined for five hours at 500° C. under nitrogen, and then shaped and fired for another hour under nitrogen.

There remains a need for new and improved processes for the production of fine grain ferrimagnetic spinel compositions.

Accordingly, it is an object of this invention to provide an improved precipitation procedure for the production of a ferrimagnetic spinel composition having an average particle size of less than about 1000 angstroms.

It is another object of this invention to provide a ferrimagnetic spinel composition having a ferrite crystal lattice structure of improved dimensional stability and strength, and which exhibits improved magnetic properties such as permeability and loss factor.

Other objects and advantages of the present invention shall become apparent from the accompanying description and example.

DESCRIPTION OF THE INVENTION

One or more objects of the present invention are accomplished by the provision of a process for the production of a fine ferrimagnetic spinel which comprises (1) forming a solvent solution containing nickel, zinc, and iron metalorganic compounds in quantities and with metal valences that subsequently yield a spinel product corresponding to the formula:

$$M_1Fe_2O_4$$

where M is nickel, zinc, or a combination thereof; (2) heating the solution of metalorganic compounds at a temperature between about 50°-150° C.; (3) treating the solution with ammonia or an organic amine to cause formation of a gelled solution; (4) removing solvent medium from the gelled solution to provide a solid-phase spinel precursor; and (5) pyrolyzing the spinel precursor in the presence of molecular oxygen at a temperature in the range between about 300°-800° C. to form a $M_1Fe_2O_4$ spinel composition having an average particle size less than about 1000 angstroms.

In a further embodiment, the present invention provides a process for the production of a fine ferrimagnetic spinel which comprises (1) forming a solvent solution containing nickel, zinc, and iron metalorganic compounds in quantities and with metal valences that subsequently yield a spinel product corresponding to the formula:

$$M_1Fe_2O_4$$

where M is nickel, zinc, or a combination thereof; (2) heating the solution of metalorganic compounds at a temperature between about 50°-150° C.; (3) treating the solution with ammonia or an organic amine to cause formation of a gelled solution; (4) removing solvent medium from the gelled solution to provide a solid-phase spinel precursor; (5) in a first stage pyrolyzing the spinel precursor in an inert atmosphere at a temperature in the range between about 300°-800° C.; and (6) in a second stage pyrolyzing the spinel precursor in the presence of molecular oxygen at a temperature in the range between about 400°-800° C. to form a $M_1Fe_2O_4$ spinel composition having an average particle size less than about 1000 angstroms.

Suitable nickel$^{+2}$, zinc$^{+2}$, and iron$^{+3}$ metalorganic starting materials include chelates such as acetylacetonates; carboxylate salts usch as acetates and benzoates; alcoholates such as methoxides and isopropoxides; and the like. Optimal results are obtainable when the metalorganic compounds are acetylacetonates.

The solution medium employed in step(1) of the invention process can be any solvent which is capable of dissolving or solvating the mixture of nickel, zinc and iron metalorganic starting compounds without decomposition. Suitable solution media besides water include aliphatic and aromatic solvents such as methanol, ethylene glycol, acetone, diisopropyl ether, tetrahydrofuran, dimethylformamide, dichloroethylene, carbon tetrachloride, hexane, benzene, toluene, and the like. Mixtures of organic solvents can be employed, and water-miscible organic solvents can be used in the form of aqueous mixtures.

When the metalorganic compounds in step(1) are acetylacetonates, the preferred solvent is tetrahydrofuran since it enhances the subsequent formation of a homogeneous gel in step(3) of the process.

The concentration of the formed solution in step(1) is not critical, and can vary over a broad range between about 2-60 weight percent, and on the average will be in the range between about 10-50 weight percent, based on solution weight.

The step(2) heating cycle is conducted at a temperature between about 50°-150° C., preferably at a temperature between about 60°-90° C., for a period between about 0.1-10 hours, preferably for a period between about 0.5-2 hours.

After the heating period is completed, the solution is cooled to ambient temperature and treated with ammonia or an organic amine to cause formation of a gelled solution. The gelling reaction is exothermic, and it is usually necessary to add the basic reagent slowly with stirring to prevent an uncontrolled temperature increase. With some gelling media the application of cooling may be desirable during the addition of the basic reagent.

The ammonia can be introduced as a gas, or in the form of an aqueous ammonium hydroxide solution. Alternatively, an organic amine can be employed as the basic reagent. Suitable organic amines include methylamine, diethylamine, tributylamine, triphenylamine, tetramethylammonium hydroxide, pyridinium hydroxide, and the like.

The basic reagent is added in a quantity which is sufficient to effect the desired rate and degree of gelling in the solution medium. Preferably, the basic reagent provides a solution pH above about 9, and most preferably a pH in the range between about 9.5-12.

Following formation of the gelled solution, the solvent medium is removed from the gelled solution to provide a residual solid-phase spinel precursor composition. One convenient means of stripping the solvent medium is by distillation under vacuum with a roto-vac type of equipment.

The solid-phase spinel precursor is loaded into a suitable refractory vessel and subjected to pyrolysis conditions at about 300°-800° C. in the presence of molecular oxygen (e.g., a molecular oxygen-containing environment such as air). Under pyrolysis conditions, a ferrimagnetic $Ni_{1-x}Zn_x Fe_2O_4$ spinel is formed from the precursor by means of a solid state reaction.

The organic content of the spinel precursor is combusted during the oxidative pyrolysis period. To reduce the hazard associated with this type of combustion, it is particularly preferred to pyrolyze the spinel precursor in two stages. In the first stage the spinel precursor is pyrolyzed at high temperature under an inert atmosphere such as nitrogen until the evolution of volatile gases has ceased. In this manner, substantially all of the organic content of the spinel precursor composition is eliminated prior to a second stage combustion cycle in the presence of molecular oxygen.

The first stage pyrolysis in an inert environment can be accomplished at 300°-800° C. for a period between about 0.1-5 hours. The second stage pyrolysis in the presence of molecular oxygen can be accomplished at 400°-800° C. for a period between about 0.1-3 hours until the conversion of spinel precursor to $M_1Fe_2O_4$ spinel is completed.

The ferrimagnetic $M_1Fe_2O_4$ spinel composition obtained from the pyrolysis step of the process is in the form of a coarse powder or an agglomerated mass. It is an important aspect of the present invention process that the crystallite and particle size of the $M_1Fe_2O_4$ spinel product is extremely fine, i.e., an average crystallite size less than about 500 angstroms, and an average particle size less than about 1000 angstroms.

The coarse powder spinel obtained directly from the pyrolysis step is readily converted into a fine grain powder by conventional means such as ball-milling. The large particles are physical agglomerates of the inherent fine particles which are readily susceptible to ball-milling or similar particle size reduction procedure.

The ferrimagnetic spinel compositions of the present invention are characterized by excellent physical and magnetic properties. Of particular interest is a $M_1Fe_2O_4$ spinel corresponding to a $Ni_{0.7}Zn_{0.3}Fe_2O_4$ composition having an average particle size less than about 1000 angstroms.

The crystallography and magnetic structures of spinel ferrites is detailed on pages 991–998 in "Introduction to Ceramics" by W. D. Kingery, H. K. Bowen, and D. R. Uhlmann, Second Edition (John Wiley & Sons 1976).

The following Example is further illustrative of the present invention. The specific ingredients and processing parameters are presented as being typical, and various modifications can be derived in view of the foregoing disclosure within the scope of the invention.

EXAMPLE

This example illustrates the synthesis of a ferrimagnetic nickel-zinc ferrite having the composition $Ni_{0.7}Zn_{0.3}Fe_3O_4$.

A 630.2 gram quantity of Fe(acetylacetonate)$_3$ (1.78 moles), and 182.9 grams of Ni(acetylacetonate)$_2$.2$H_2O$ (0.62 mole), and 80.2 grams of Zn(acetylacetonate)$_2$.2-$H_2O$ (0.27 mole) are dissolved in 3 liters of tetrahydrofuran contained in a round-bottom flask equipped with a condenser, stirrer, and dropping funnel.

The metal acetylacetonate solution is refluxed for one hour with stirring, and then the solution is cooled to room temperature. A 500 milliliter quantity of concentrated aqueous ammonia (28–30%) is added dropwise to the metal acetylacetonate solution over a period of 0.7–1 hour. The rate of addition is controlled to prevent a boil-over during the exothermic gelling reaction.

The gelled solution is refluxed for one hour, and then the solvent is stripped off to provide a solid phase spinel precursor. The spinel precursor is loaded into an alumina boat and pyrolyzed in a furnace at 500° C. under an inert atmosphere of nitrogen gas. When the evolution of volatile material has ceased (about 15–20 minutes), the resultant char is ground to a fine powder with a mortar and pestle or a ball mill. The fine powder is reloaded into an alumina boat, and the material is pyrolyzed for 15–20 minutes at 600° C. in an environment of molecular oxygen. The resultant brown powder is a ferrimagnetic spinel.

The average particle size as determined by Scanning Electron Microscope measurements is less than about 1000 angstroms. About 110 grams of ferrimagnetic spinel product is obtained, which corresponds to a yield of 50–55 weight percent.

What is claimed is:

1. A process for the production of a fine ferrimagnetic spinel which comprises (1) forming a solvent solution containing nickel, zinc, and iron chelate, alcoholate or carboxylate salt metalorganic compounds in quantities and with metal valences that subsequently yield a spinel product corresponding to the formula:

$$M_1Fe_2O_4$$

where M is nickel, zinc, or a combination thereof; (2) heating the solution of metalorganic compounds at a temperature between about 50°–150° C.; (3) treating the solution with ammonia or an organic amine to cause formation of a gelled solution; (4) removing solvent medium from the gelled solution to provide a solid-phase spinel precursor; and (5) pyrolyzing the spinel precursor in the presence of molecular oxygen at a temperature in the range between about 300°–800° C. to form a $M_1Fe_2O_4$ spinel composition having an average particle size less than about 1000 angstroms.

2. A process in accordance with claim 1 wherein the solvent medium comprises an organic solvent, and the metalorganic compounds are metal acetylacetonates.

3. A process in accordance with claim 1 wherein the spinel product has a $Ni_{0.7}Zn_{0.3}Fe_2O_4$ composition.

4. A process for the production of a fine ferrimagnetic spinel which comprises (1) forming a solvent solution containing nickel, zinc, and iron chelate, alcoholate or carboxylate salt metalorganic compounds in quantities and with metal valences that subsequently yield a spinel product corresponding to the formula:

$$M_1Fe_2O_4$$

where M is nickel, zinc, or a combination thereof; (2) heating the solution of metalorganic compounds at a temperature between about 50°–150° C.; (3) treating the solution with ammonia or an organic amine to cause formation of a gelled solution; (4) removing solvent medium from the gelled solution to provide a solid-phase spinel precursor; (5) in a first stage pyrolyzing the spinel precursor in an inert atmosphere at a temperature in the range between about 300°–800° C.; and (6) in a second stage pyrolyzing the spinel precursor in the presence of molecular oxygen at a temperature in the range between about 400°–800° C. to form a $M_1Fe_2O_4$ spinel composition having an average particle size less than about 1000 angstroms.

5. A process in accordance with claim 4 wherein the solvent medium comprises an organic solvent, and the metalorganic compounds are metal acetylacetonates.

6. A process in accordance with claim 4 wherein the step(2) solution is heated for a period between about 0.3–2 hours.

7. A process in accordance with claim 4 wherein the step(3) treatment is with ammonia at ambient temperature.

8. A process in accordance with claim 4 wherein the step(3) treatment is with an organic amine at ambient temperature.

9. A process in accordance with claim 4 wherein the step(5) first stage pyrolysis is for a period between about 0.1–5 hours until the evolution of volatiles is completed.

10. A process in accordance with claim 4 wherein the step(6) second stage pyrolysis is for a period between about 0.1–3 hours until the conversion of spinel precursor to $M_1Fe_2O_4$ spinel is completed.

11. A process in accordance with claim 4 wherein the step(6) second stage pyrolysis is in the presence of air.

12. A process in accordance with claim 4 wherein the spinel product has a $Ni_{0.7}Zn_{0.3}Fe_2O_4$ composition.

* * * * *